United States Patent
Meyer et al.

(10) Patent No.: US 9,605,658 B2
(45) Date of Patent: Mar. 28, 2017

(54) DEVICE FOR MEASURING DEFORMATIONS OF A ROTOR BLADE OF A WIND TURBINE GENERATOR SYSTEM, AND CORRESPONDING ROTOR BLADE

(71) Applicant: DR. JOHANNES HEIDENHAIN GmbH, Traunreut (DE)

(72) Inventors: Hermann Meyer, Schneizlreuth (DE); Josef Thaler, Traunreut (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 204 days.

(21) Appl. No.: 14/542,675

(22) Filed: Nov. 17, 2014

(65) Prior Publication Data
US 2015/0135859 A1 May 21, 2015

(30) Foreign Application Priority Data
Nov. 21, 2013 (DE) .................. 10 2013 223 780

(51) Int. Cl.
*G01L 1/04* (2006.01)
*F03D 11/00* (2006.01)
(Continued)

(52) U.S. Cl.
CPC .......... *F03D 11/0091* (2013.01); *F03D 17/00* (2016.05); *G01B 5/30* (2013.01);
(Continued)

(58) Field of Classification Search
CPC ............. B60R 2021/01516; G01L 3/24; F03D 11/0091; B29C 66/90
(Continued)

(56) References Cited

U.S. PATENT DOCUMENTS

| 8,482,247 B2 * | 7/2013 | Lechte .................... F03D 80/00 320/101 |
| 2015/0135859 A1 | 5/2015 | Meyer et al. |
| 2016/0076523 A1 * | 3/2016 | Meyer ................ F03D 11/0091 73/862.621 |

FOREIGN PATENT DOCUMENTS

| CH | 127311 A | 8/1928 |
| CH | 151371 A | 12/1931 |

(Continued)

OTHER PUBLICATIONS

SKF, WO2013045610, Device and Method for detecting a distance value, Apr. 4, 2013.*
U.S. Appl. No. 14/854,063, filed Sep. 15, 2015.

*Primary Examiner* — Lisa Caputo
*Assistant Examiner* — Nigel Plumb
(74) *Attorney, Agent, or Firm* — Leydig, Voit & Mayer, Ltd.

(57) ABSTRACT

A device for measuring deformations of a rotor blade of a wind turbine generator system includes an angle measuring device and an arm. The angle measuring device includes a first and a second assembly. The first assembly is pivotable relative to the second assembly about an axis. The second assembly has a fastening site that is configured to be connected to the rotor blade. The angle measuring device is configured to measure a relative angular position between the first and the second assembly. The arm has a connection site disposed at a distance to the fastening site and is configured to be connected to the rotor blade at the connection site. The arm is mechanically coupled to the first assembly at a radial distance such that, in response to a change in the distance, a relative angular displacement is generated between the first and the second assembly.

15 Claims, 3 Drawing Sheets

(51) Int. Cl.
*G01L 1/24* (2006.01)
*G01B 5/30* (2006.01)
*F03D 17/00* (2016.01)

(52) U.S. Cl.
CPC .................. *G01L 1/04* (2013.01); *G01L 1/24* (2013.01); *F05B 2270/331* (2013.01); *F05B 2270/808* (2013.01); *Y02E 10/721* (2013.01); *Y02E 10/722* (2013.01)

(58) Field of Classification Search
USPC ................ 73/862.621, 862.381, 862; 156/64
See application file for complete search history.

(56) References Cited

FOREIGN PATENT DOCUMENTS

| | | |
|---|---|---|
| DE | 29720741 U1 | 5/1998 |
| DE | 19847982 A1 | 6/1999 |
| EP | 2876406 A1 | 5/2015 |
| FR | 2487503 A2 | 1/1982 |
| FR | 2665527 A2 | 2/1992 |
| WO | WO 2013045610 A1 | 4/2013 |

* cited by examiner

DEVICE FOR MEASURING DEFORMATIONS OF A ROTOR BLADE OF A WIND TURBINE GENERATOR SYSTEM, AND CORRESPONDING ROTOR BLADE

CROSS-REFERENCE TO PRIOR APPLICATION

Priority is claimed to German Patent Application No. DE 10 2013 223 780.4, filed on Nov. 21, 2013, the entire disclosure of which is hereby incorporated by reference herein.

FIELD

The present invention relates to a device for measuring deformations of a rotor blade of a wind turbine generator system, as well as to a correspondingly designed rotor blade.

BACKGROUND

A device for measuring vibrations of a rotor blade of a wind turbine generator system is described in the German Patent Application DE 19847982 A1 which describes using a distance sensor as a linear element to ascertain a deformation of the rotor blade.

SUMMARY

In an embodiment, the present invention provides a device for measuring deformations of a rotor blade of a wind turbine generator system. The device includes an angle measuring device and an arm. The angle measuring device includes a first and a second assembly. The first assembly is pivotable relative to the second assembly about an axis. The second assembly has a fastening site that is configured to be connected to the rotor blade. The angle measuring device is configured to measure a relative angular position between the first and the second assembly. The arm has a connection site and is configured to be connected to the rotor blade at the connection site. The connection site is disposed at a distance to the fastening site of the second assembly. The distance is oriented orthogonally to the axis. The arm is mechanically coupled to the first assembly at a radial distance such that, in response to a change in the distance, a relative angular displacement is generated between the first and the second assembly.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
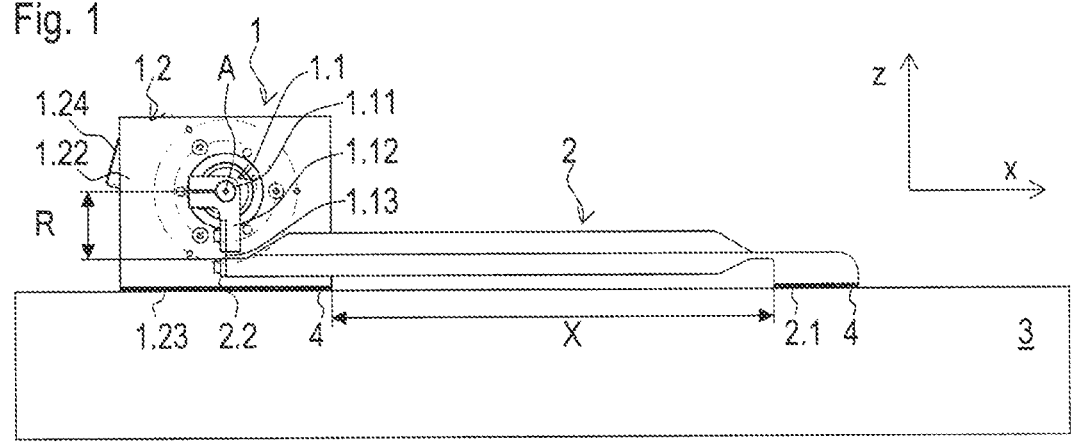
FIG. 1 shows a side view of a device for measuring deformations of a rotor blade.

Rotor blades of wind turbine generator systems are subject to greatly varying forces that naturally lead to deformations of the rotor blades and, as the case may be, excite them into vibration. The weight force of a rotating rotor blade alone produces a periodic deformation of the rotor blade in question. These deformations are superimposed by further deformations which result, inter alia, from the aerodynamic loads. For example, the aerodynamic loads depend on the vertical profile of the wind velocity in combination with wind gusts or wind turbulences. The positive pressure on the windward side of the tower also causes a pulsating force to be introduced into the rotor blade upon every rotation. At any rate, it is difficult to predict the magnitude of the deformations of rotor blades of a wind turbine generator system, which is why current efforts are directed to measuring these as actual values.

With regard to predicting fatigue damage, it may be advantageous, at a desired point in time, to generate information retrospectively about an accumulated loading on the rotor blade on the basis of the measured deformations, respectively loads. Thus, the availability of such load values is significant, particularly with regard to short-term maximum loads or the fatigue damage to be expected. Moreover, by taking the actual deformations, respectively actual loads into consideration, it is possible to optimize the control of the wind turbine generator system, for example, by adjusting the pitch angles.

In an embodiment, the present invention provides a device for measuring deformations of a rotor blade of a wind turbine generator system that will be rugged and operate reliably with a high degree of precision. An embodiment of the present invention also provides a rotor blade whose deformations will be able to be reliably determined with a high level of accuracy.

According to an embodiment, the device for measuring deformations of a rotor blade of a wind turbine generator system includes an angle measuring device that has a first and a second assembly, as well as an arm. Relative to the second assembly, the first assembly of the angle measuring device is configured to be pivotable about an axis, the relative angular position between the first and the second assembly being measurable by the angle measuring device. The second assembly of the angle measuring device is designed to be able to be immovably connected to the rotor blade. The arm has a (first) connection site that is designed to allow the arm be connected at this connection site to the rotor blade. In addition, the connection site is configured at a distance to the fastening site of the second assembly, the distance being oriented orthogonally to the axis. The arm is mechanically coupled to the first assembly at a radial distance to the axis, so that, in response to a change in the distance between the connection site and the fastening site, a relative angular displacement may be generated between the first and the second assembly.

Even when a connecting line between the connection site and the fastening site does not extend strictly orthogonally to the axis, it is nevertheless possible to ascertain a distance that is orthogonal to the axis, as long as the connecting line between the connection site and the fastening site does not extend exactly in parallel to the axis. Accordingly, the formulation, whereby the distance is orthogonal to the axis, is understood to mean that a connecting line between the connection site and the fastening site has a directional component (in accordance with the distance normal to the axis direction) that is oriented orthogonally to the axis.

The arm is advantageously fabricated from a material that includes plastic. In particular, the plastic may be fiber-reinforced, for example glass fiber- and/or carbon fiber-reinforced.

In a further embodiment of the present invention, the first assembly is articulated to the arm, in particular, via a flexible component that may be in the form of a solid joint, respectively a one-piece joint.

In addition, the (first) connection site of the arm may be configured as a bonding surface.

The angle measuring device advantageously has a rolling-contact bearing or a plurality thereof for pivotally mounting the first assembly relative to the second assembly. This type of bearing design is also used for guiding the arm. Alternatively, a slide bearing or a solid joint may also be used for pivotally mounting the first assembly relative to the second assembly.

In an advantageous design, the second assembly of the angle measuring device advantageously includes a fastening site that is configured to be able to be immovably connected to the inner side of the rotor blade, in particular in the area of the rotor blade root.

One embodiment of the present invention provides that the angle measuring device include a measuring standard and an element for scanning the same. The measuring standard may have an annular shape and, considered geometrically, is then a hollow cylinder having circumferentially extending lateral faces. The lateral faces may be low in height, so that the measuring standard is configured as an annular disk having mutually parallel oriented end faces that may also be described as bottom or cover surfaces. The angular scaling or angular encoding may be applied to one of the end faces.

Especially when the measuring standard is configured in such a way that the lateral faces have a comparatively greater height, thus, in the case of a rather drum-shaped measuring standard, the angular scaling may be applied to the lateral face. However, the measuring standard may also be configured as a measuring tape that is fastened to the lateral face of a cylindrical body, on the outer or inner side thereof.

In addition, the measuring standard may be configured to have a scaling only over a limited angular range, thus, not extend over 360°, rather have only one angular segment as a measuring range. The angular extent of the measuring standard may be adjusted to the maximum measuring range, respectively pivot angle.

The element for scanning the measuring standard is advantageously designed to be photosensitive, respectively light-sensitive. Accordingly, a scanning of this kind is also based on an optical principle.

Alternatively, the scanning may be based on an inductive or magnetic principle.

Another embodiment of the present invention provides a rotor blade of a wind turbine generator system having a device for measuring deformations. This device, in turn, includes an angle measuring device and an arm. The angle measuring device features a first and a second assembly. Relative to the second assembly, the first assembly is configured to be pivotable about an axis; the relative angular position between the first and second assembly being measurable by the angle measuring device. The second assembly features a fastening site that is joined to the rotor blade. For its part, the arm has a (first) connection site that is connected to the rotor blade, the connection site being configured at a distance to the fastening site of the second assembly, the distance being oriented orthogonally to the axis. The arm is mechanically coupled to the first assembly at a radial distance, so that, in response to a change in the distance between the connection site and the fastening site, a relative angular displacement may be generated between the first and the second assembly.

In a further embodiment of the rotor blade, the arm is oriented in the longitudinal direction of the rotor blade, the rotor blade (at least in the root area thereof) having a longitudinally extending central longitudinal axis. The (pivot) axis of the angle measuring device is essentially oriented orthogonally to the longitudinal direction of the rotor blade. In this context, the angle measuring device may be configured in such a way that the axis is essentially oriented in parallel to the inner wall of the rotor blade, or configured in such a way that the axis is essentially oriented orthogonally to the inner wall of the rotor blade. Accordingly, the arm is oriented in the longitudinal direction of the rotor blade, and the (pivot) axis of the angle measuring device is oriented tangentially or radially to the longitudinal direction of the rotor blade. The tangential or radial orientation is relative to a circular arc, in particular, whose center point comes to rest on the longitudinal axis of the rotor blade.

The angle measuring device may, in particular, deliver digital position signals and/or signals that have been generated by differentiating the position signals over time, once or repeatedly. The signals in question may be transmitted purely digitally and serially, making a comparatively simple processing of the signals possible, for example, for integration in a highly dynamic control.

The angle measuring device advantageously features a measuring standard having an absolute encoding, thereby making the relative angular position between the first and second assembly measurable as an absolute value (in contrast to an incremental measurement). In this manner, the absolute deformation of the rotor blade may be measured at any desired points in time. This is particularly advantageous for inspecting the settlement processes in the rotor blade structure. Such an inspection is performed outside of the actual operation by driving the rotor blade in question into a horizontal position. The deformation is subsequently measured in this position. If an absolute angle measuring device is used, the absolute measured value may be directly compared to the preceding (likewise absolute) measurements.

In addition, the device for measuring deformations may be installed at the root of the rotor blade, thus, in the vicinity of the rotor blade connection at the hub of the wind turbine generator system. Thus, the second assembly may be fastened at a hub in the area of the blade connection. Alternatively, the fastening site may be configured at an inner surface of the hub of the wind turbine generator system in question.

In a further embodiment of the present invention, the arm, respectively the material that it is made of has the same coefficient of thermal expansion as the rotor blade, respectively the material thereof.

The rotor blade advantageously has a plurality of devices for measuring deformations. Following logic operations, respectively computations performed on the particular signals, a spatial deformation of the rotor blade may be determined from the signals thereby generated by the individual devices.

Figure 2:
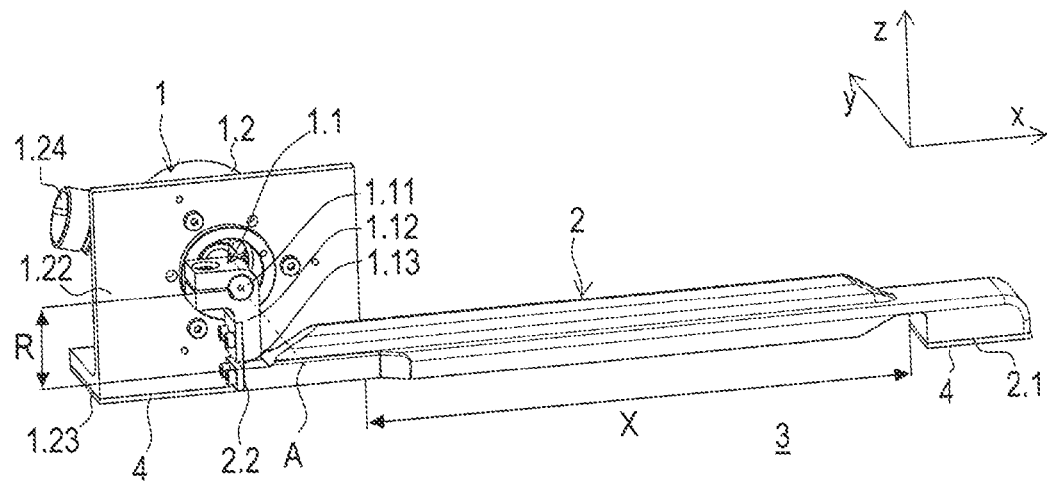
FIG. 2 shows a perspective view of the device for measuring deformations of a rotor blade.

FIGS. 1 and 2 show a device for measuring deformations of a rotor blade 3 of a wind turbine generator system. In the exemplary embodiment presented here, rotor blade 3 in question is a component of a wind turbine generator system having a horizontal axis, that, in particular, has all together three rotor blades 3. The device in question for measuring deformations of rotor blade 3 includes an angle measuring device 1 and an arm 2.

Figure 3:
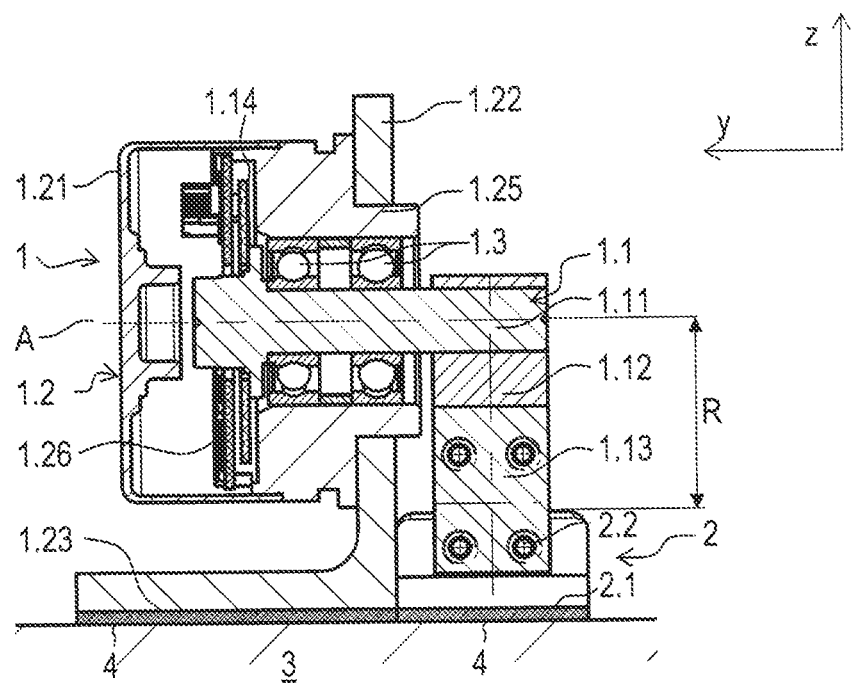
FIG. 3 shows a side view of the device for measuring deformations of a rotor blade.
Figure 4:
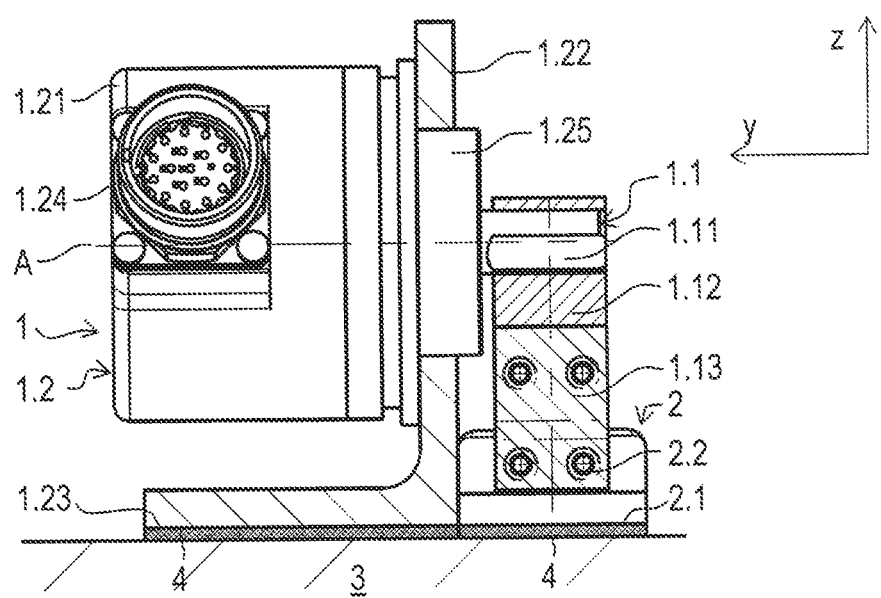
FIG. 4 shows a rear view of the device for measuring deformations of a rotor blade.

Angle measuring device 1 shown in FIGS. 3 and 4, in particular, includes a first assembly 1.1 and a second assembly 1.2. First assembly 1.1 has a shaft 1.11 including a shoulder to which a measuring standard 1.14 is bonded, for example by a bonding agent, permanently and only with small tolerance deviations, centrically relative to an axis A. Axis A extends in the y-direction. In the exemplary embodiment presented here, measuring standard 1.14 is made of glass and has an annular shape. Inherently, it has two end faces, an angular scaling being applied to one of them. Angular scaling may be configured as an incremental graduation, for example, having radially oriented scale graduation marks, it also being possible for an absolute code to be additionally or alternatively provided, however.

A driver 1.12 (see also FIGS. 1 and 2) is secured to shaft 1.11 in such a way that it is clamped against rotation, so that, in response to movement of driver 1.12, an angular displacement of shaft 1.11 may be generated. Driver 1.12 may be assigned to first assembly 1.1 and has a machined surface and an internal thread, thereby allowing a component 1.13 to be precisely fixed thereto. Component 1.13 serves as a solid joint and, accordingly, has a flexurally soft design. In particular, component 1.13 may be configured as a thin-walled, small steel plate.

In accordance with FIG. 3, shaft 1.11 is bearing-supported by two rolling-contact bearings 1.3 within a body 1.25 that is to be assigned to second assembly 1.2. Also to be assigned to second assembly 1.2 is a light source that includes an LED and a collimator lens, for example, so that collimated light is emitted by the light source. This light is transmitted through measuring standard 1.14, respectively the angular scaling thereof, and is modulated in accordance with the angular position between first assembly 1.1 and second assembly 1.2, respectively shaft 1.11 and body 1.25. The modulated light is scanned by a scanning device 1.26 that is fastened to body 1.25. Corresponding light-sensitive, respectively photosensitive detectors are located on scanning device 1.26 configured as a populated circuit board. Scanning device 1.26 also includes, inter alia, electronic signal-shaping components, for example, for amplifying and digitizing the scanning signals delivered by the detectors.

Mounted around scanning device 1.26 is a housing 1.21, so that, inter alia, the light source, measuring standard 1.14, and scanning device 1.26 are protected from environmental influences. A holder 1.22 is attached to body 1.25. As a fastening site 1.23, this holder 1.22 has a joining surface, in this case a bonding surface.

An electrical connection is established between angle measuring device 1 and a subsequent electronics via a connecting cable that is connected to a socket 1.24, thereby allowing electrical signals and electrical power to be transmitted between the subsequent electronics and angle measuring device 1.

Thus, the relative angular position between first assembly 1.1 and second assembly 1.2, respectively between shaft 1.11 and body 1.25 may be determined by angle measuring device 1. Angle measuring devices 1 of this kind are frequently referred to as rotary encoders.

Besides angle measuring device 1, the device for measuring deformations includes arm 2. In the exemplary embodiment presented here, it is fabricated from a fiberglass reinforced plastic and has a first connection site 2.1 and a second connection site 2.2.

The first connection site 2.1 of arm 2 is configured as a surface area, allowing it to be bonded to rotor blade 3. As is arm 2, rotor blade 3 is fabricated from fiberglass reinforced plastic.

In the exemplary embodiment, second connection site 2.2 is a stop face on which component 1.13 is mounted by screw connections, for example.

In the course of installing the device for measuring deformations of a rotor blade 3 of a wind turbine generator system, first connection site 2.1 of arm 2, as well as fastening site 1.23 of holder 1.22 are adhesively bonded to the inner side of the wall of rotor blade 3 in the area of the root of rotor blade 3. Accordingly, the gap between fastening site 1.23, respectively between connection site 2.1 and the inner side of rotor blade 3 are filled with a bonding agent 4. This creates immovable connections between holder 1.22 and rotor blade 3, as well as between arm 2 and rotor blade 3. Once the installation is complete, arm 2 is oriented to extend in the x-direction, x-direction essentially corresponding to longitudinal axis $\xi$ (FIG. 5) of rotor blade 3. Thus, the first connection site is located at a distance X to fastening site 1.23 of second assembly 1.2, distance X being oriented orthogonally to axis A. Relative to axis A, arm 2 is mechanically coupled, in particular articulated to angle measuring device 1 at radial distance R. In this manner, a change in distance X, for example in response to an elongation or a contraction of rotor blade 3, may generate a relative angular displacement between first and second assembly 1.1, 1.2.

By configuring component 1.13 as a thin-walled, small steel plate, it is possible to reduce flexural torques in the device without unfavorably influencing the measuring accuracy. Component 1.13 is dimensioned to allow the flexural softness thereof to be adapted to the required torsional moment, respectively resistance moment of the angle measuring device.

Figure 5:
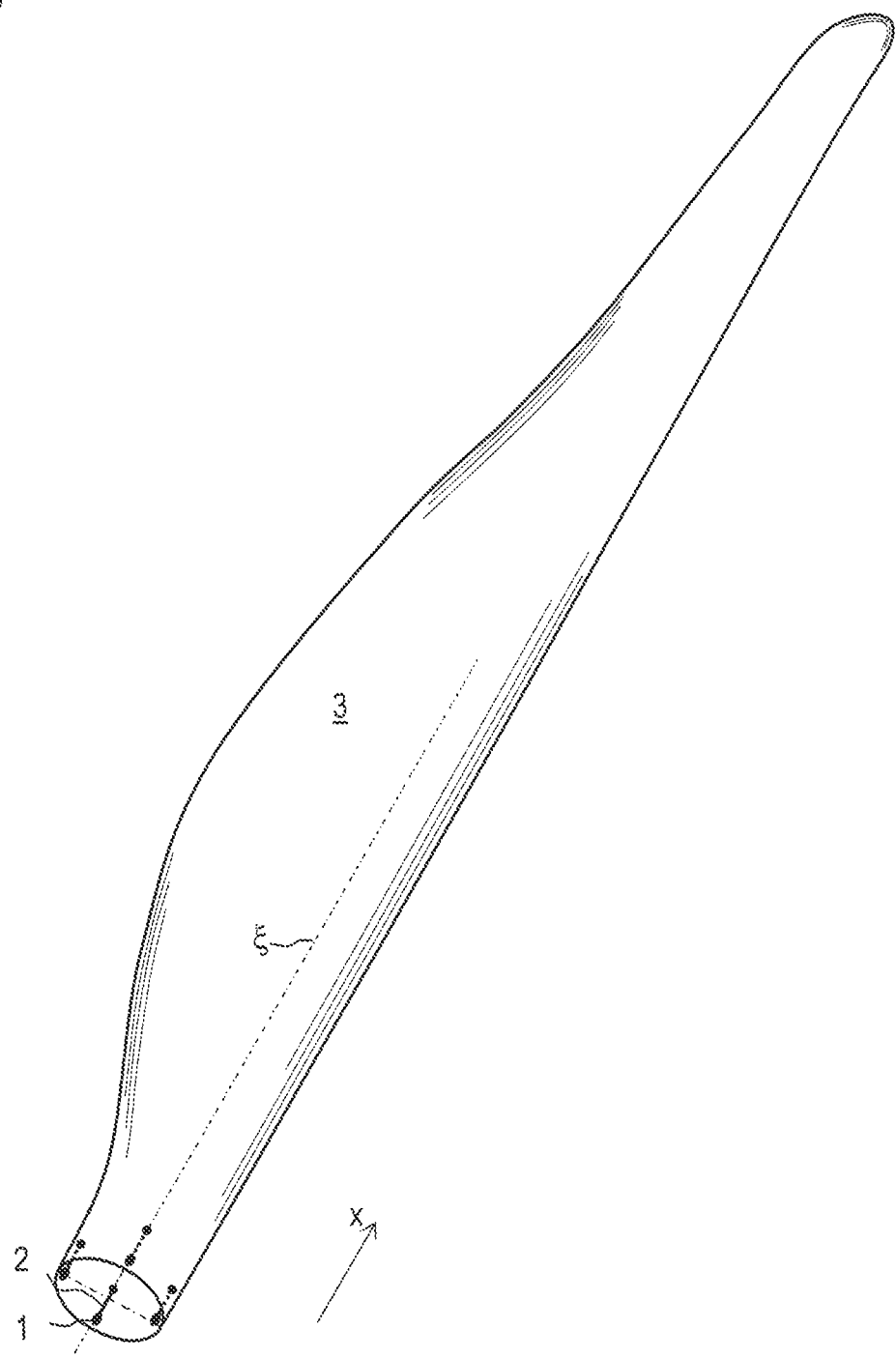
FIG. 5 shows a schematic view of a rotor blade including devices for measuring deformations.

To be able to draw conclusions about the deformation of rotor blade 3 in all dimensions, it is advantageous when a plurality, for example four, of such devices for measuring deformations are installed in the root of rotor blade 3, as illustrated in FIG. 5. The four devices for measuring deformations are preferably configured to be offset by 90° in each case, preferably in the four principal bending directions over the circumference of the root of a rotor blade 3.

During operation of the wind turbine generator system, rotor blades 3 are deformed by the own weight thereof and by aerodynamic loads. In particular, the loads lead to elongations or compressions of rotor blade 3 in the x-direction. The distance between fastening site 1.23 of holder 1.22 and first connection site 2.1 of arm 2 changes in proportion thereto. For instance, if distance X is approximately 500 mm, the distance between fastening site 1.23 of holder 1.22 and first connection site 2.1 changes by approximately 0.5 mm in response to typical loads. If R is dimensioned to be 30 mm, for instance, this leads to an angular displacement between first assembly 1.1 and second assembly 1.2 of approximately 1°. Angle measuring device 1 described above, which operates in accordance with a precise optical principle, has a resolution of 25 bits, for example, for one rotation (360°). Based on the mentioned geometric boundary conditions, this corresponds to a resolution of 5.6 nm in relation to the changes in the length of distance X between fastening site 1.23 of holder 1.22 and first connection site 2.1 of arm 2.

The device for measuring deformations of a rotor blade 3 is naturally subject to substantial temperature fluctuations in a wind turbine generator system. Nevertheless, even under these adverse ambient conditions, exceptionally high measurement accuracies may be attained using the device described above for measuring deformations. The reason for this, on the one hand, is that, by measuring the angular positions, the thermal expansion of measuring standard 1.14 hardly plays a role (the distances between the graduation lines and the width thereof vary with temperature, but not the angular position). On the other hand, arm 2 and rotor blade 3 are manufactured from the same material, so that both have the same thermal expansion properties. Finally, the pot-shaped, electrically conductive housing 1.21 makes it possible to ensure an optimal overvoltage protection, in particular for scanning device 1.26 and the corresponding electronics, in the case of electrical storms, for example.

The signals that may be output via socket 1.24 are advantageously fully digital, making it possible for the subsequent electronics mentioned above to process the signals from all devices for measuring deformations of the rotor blades without further digitization. On the one hand, this ensures a signal transmission that is reliably protected against external disturbances. On the other hand, the signals may be processed relatively simply, making it possible for the measured deformations to be used in a closed-loop circuit, for example for (separately) controlling the pitch angle for each rotor blade 3.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A device for measuring deformations of a rotor blade of a wind turbine generator system, comprising:
    an angle measuring device that includes a first and a second assembly, the first assembly being pivotable relative to the second assembly about an axis, the second assembly having a fastening site that is configured to be connected to the rotor blade, the angle measuring device being configured to measure a relative angular position between the first and the second assembly; and
    an arm having a connection site and being configured to be connected to the rotor blade at the connection site, the connection site being disposed at a distance to the fastening site of the second assembly, the distance being oriented orthogonally to the axis in a direction of extension of the arm,
    wherein the arm is mechanically coupled to the first assembly at a radial distance such that, in response to a change in the distance, a relative angular displacement is generated between the first and the second assembly.

2. The device as recited in claim 1, wherein the arm is fabricated from a material that includes plastic.

3. The device as recited in claim 2, wherein the plastic is fiber-reinforced.

4. The device as recited in claim 1, wherein the first assembly is articulated to the arm via a flexible component.

5. The device as recited in claim 1, wherein the connection site is formed as a bonding surface.

6. The device as recited in claim 1, wherein the angle measuring device includes a rolling-contact bearing pivotally mounting the first assembly relative to the second assembly.

7. The device as recited in claim 1, wherein the angle measuring device includes a measuring standard and an element configured to scan the measuring standard.

8. The device as recited in claim 7, wherein the element configured to scan the measuring standard is photosensitive.

9. A rotor blade of a wind turbine generator system having a device for measuring deformations, the device comprising:
    an angle measuring device that includes a first and a second assembly, the first assembly being pivotable relative to the second assembly about an axis, the second assembly having a fastening site that is connected to the rotor blade, the angle measuring device being configured to measure a relative angular position between the first and the second assembly; and
    an arm having a connection site and being joined to the rotor blade at the connection site, the connection site being disposed at a distance to the fastening site of the second assembly, the distance being oriented orthogonally to the axis in a direction of extension of the arm,
    wherein the arm is mechanically coupled to the first assembly at a radial distance such that, in response to a change in the distance, a relative angular displacement is generated between the first and the second assembly.

10. The rotor blade as recited in claim 9, wherein the arm is oriented in a longitudinal direction of the rotor blade.

11. The rotor blade as recited in claim 9, wherein the fastening site of the second assembly is connected to an inner side of the rotor blade.

12. The rotor blade as recited in claim 11, wherein the arm oriented in a longitudinal direction of the rotor blade, and the axis is oriented tangentially or radially to the longitudinal axis of the rotor blade.

13. The rotor blade as recited in claim 9, wherein the device for measuring deformations is installed at a root of the rotor blade.

14. The rotor blade as recited in claim 9, wherein the arm has a same coefficient of thermal expansion as the rotor blade.

15. The rotor blade as recited in claim 9, further comprising a plurality of devices configured to measure deformations of the rotor blade.

\* \* \* \* \*